(12) United States Patent
Nishioka

(10) Patent No.: US 10,867,168 B2
(45) Date of Patent: Dec. 15, 2020

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Shintaro Nishioka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 65 days.

(21) Appl. No.: 16/260,146

(22) Filed: Jan. 29, 2019

(65) Prior Publication Data

US 2020/0097712 A1 Mar. 26, 2020

(30) Foreign Application Priority Data

Sep. 25, 2018 (JP) ................................ 2018-179373

(51) Int. Cl.
*G06K 9/00* (2006.01)
*G06K 9/34* (2006.01)

(52) U.S. Cl.
CPC ..... *G06K 9/00449* (2013.01); *G06K 9/00463* (2013.01); *G06K 9/00469* (2013.01); *G06K 9/344* (2013.01); *G06K 2209/01* (2013.01)

(58) Field of Classification Search
CPC ........... G06K 9/00449; G06K 9/00463; G06K 9/00469; G06K 9/344; G06K 2209/01
See application file for complete search history.

(56) References Cited

U.S. PATENT DOCUMENTS

| 5,966,464 A * | 10/1999 | Kojima | G06K 9/6292 |
| | | | 382/228 |
| 6,341,176 B1 * | 1/2002 | Shirasaki | G06K 9/72 |
| | | | 382/229 |
| 2001/0055423 A1 * | 12/2001 | Fujiwara | G06K 9/03 |
| | | | 382/182 |
| 2002/0083079 A1 * | 6/2002 | Meier | G06F 16/93 |
| 2003/0226117 A1 * | 12/2003 | Wettstein | G06K 9/03 |
| | | | 715/268 |
| 2006/0217958 A1 * | 9/2006 | Tagawa | G06F 40/45 |
| | | | 704/2 |
| 2018/0268212 A1 * | 9/2018 | Kubota | G06K 9/3283 |
| 2019/0026587 A1 * | 1/2019 | Simpson | G06K 9/3208 |
| 2019/0294912 A1 * | 9/2019 | Takabayashi | G06K 9/4604 |

FOREIGN PATENT DOCUMENTS

JP 2016212812 12/2016

* cited by examiner

*Primary Examiner* — John B Strege
(74) *Attorney, Agent, or Firm* — JCIPRNET

(57) ABSTRACT

An information processing apparatus includes an obtaining unit that obtains image data which is data obtained by digitizing a document including plural areas in one document, a setting unit that sets a determination standard for each of the areas based on a degree of necessity of a confirming operation for a text or a picture included in the area of the image data, and a determination unit that determines a method of the confirming operation for each of the areas based on the determination standard.

20 Claims, 9 Drawing Sheets

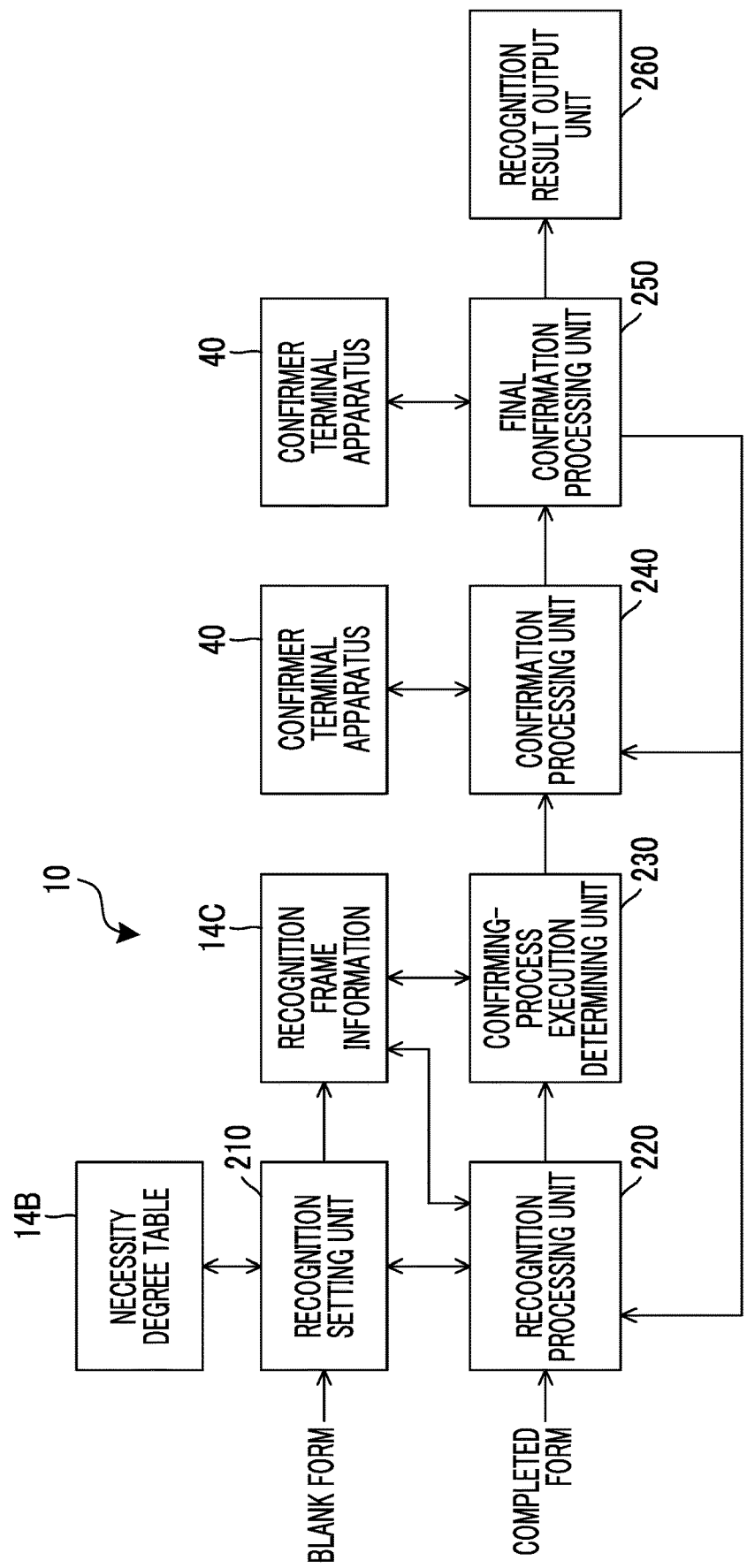

FIG. 6

FORM DEFINITION SCREEN

| RECOGNITION FRAME INFORMATION | |
|---|---|
| FRAME TYPE | ONE LINE FRAME TEXT |
| FRAME NAME | NAME 1 |
| FRAME COORDINATES | 350, 502, 626, 121 |
| TEXT TYPE | CHINESE CHARACTER, ひらがな (HIRAGANA CHARACTER), AND カタカナ (KATAKANA CHARACTER) |
| CERTAINTY FACTOR THRESHOLD VALUE | 0.7 |
| CONFIRMATION METHOD | SINGLE ENTRY ▼ |
| | SINGLE ENTRY |
| | DOUBLE ENTRY |
| | NECESSARY |
| | UNNECESSARY |

ITEM IN SELECTED STATE IS HIGHLIGHTED

CANDIDATE DISPLAY IN DROP-DOWN SELECTION

FIG. 7

FORM DEFINITION SCREEN

| RECOGNITION FRAME INFORMATION | |
|---|---|
| FRAME TYPE | ONE LINE FRAME TEXT |
| FRAME NAME | NAME OF RECIPIENT |
| FRAME COORDINATES | 350, 502, 626, 121 |
| TEXT TYPE | CHINESE CHARACTER, ひらがな (HIRAGANA CHARACTER), AND カタカナ (KATAKANA CHARACTER) |
| CERTAINTY FACTOR THRESHOLD VALUE | 0.7 |
| CONFIRMATION METHOD | NO SETTING |

FIG. 10

| ITEM NAME | TEXT IMAGE/RECOGNITION RESULT ▽ | CERTAINTY FACTOR ▽ |
|---|---|---|
| NAME 1 | ・・・・・ | ・・・・・ |
| NAME 2 | ・・・・・ | ・・・・・ |
| NAME 3 | ・・・・・ | ・・・・・ |
| ・・・・・ | ・・・・・ | ・・・・・ |
|  |  |  |

Tabs: SINGLE ENTRY | DOUBLE ENTRY | NECESSARY | UNNECESSARY (42, 42C)

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-179373 filed Sep. 25, 2018.

BACKGROUND

(i) Technical Field

The present invention relates to an information processing apparatus and a non-transitory computer readable medium storing a program.

(ii) Related Art

For example, JP2016-212812A discloses a technology for determining, by using a certainty factor which is a value for indicating certainty of a recognition result of a text included in image data obtained by digitizing a document and a predetermined threshold value of the certainty factor, a method of confirming operations which are an operation of confirming or correcting the recognition result of the text included in the image data and an operation of confirming a picture included in the image data.

SUMMARY

Meanwhile, in a case where a plurality of areas having different degrees of necessity (hereinafter, referred to as "degree of necessity") of the confirming operation coexist in one document, in a case of determining a method of the confirming operation for all of the areas by using an identical determination standard, according to a setting of the determination standard, it is apprehended that the confirming operation is not executed on the area for which necessity of the confirming operation is relatively high or the confirming operation is executed on the area for which necessity of the confirming operation is relatively low.

Aspects of non-limiting embodiments of the present disclosure relate to an information processing apparatus and a non-transitory computer readable medium storing a program capable of determining an appropriate method of a confirming operation for each of areas by using a determination standard different as compared with a case where the method of the confirming operation is determined for all of the areas by using an identical determination standard, regardless of a case where a plurality of areas having different degrees of necessity of the confirming operation coexist in one document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: an obtaining unit that obtains image data which is data obtained by digitizing a document including a plurality of areas in one document; a setting unit that sets a determination standard for each of the areas based on a degree of necessity of a confirming operation for a text or a picture included in the area of the image data; and a determination unit that determines a method of the confirming operation for each of the areas based on the determination standard.

BRIEF DESCRIPTION OF THE DRAWINGS

Exemplary embodiment (s) of the present invention will be described in detail based on the following figures, wherein:

FIG. 5 is a block diagram illustrating an example of a specific configuration of the server apparatus according to the exemplary embodiment;

FIG. 6 is a front view illustrating an example of a form definition screen according to the exemplary embodiment;

FIG. 7 is a front view illustrating another example of the form definition screen according to the exemplary embodiment;

FIG. 10 is a front view illustrating an example of a confirming operation screen according to the exemplary embodiment;

DETAILED DESCRIPTION

Hereinafter, exemplary embodiments of the present invention will be described in detail with reference to the accompanying drawings.

Figure 1:
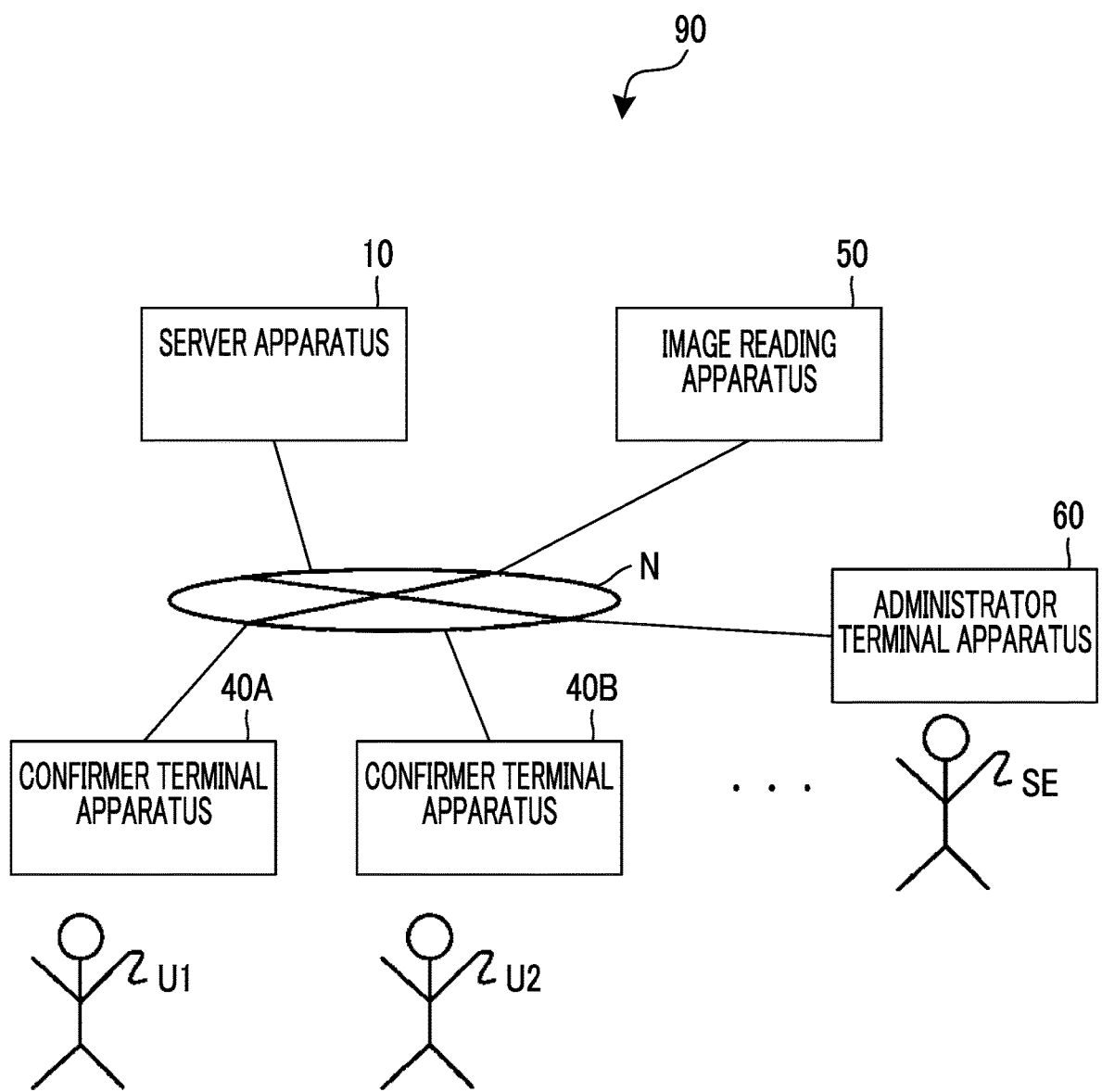
FIG. 1 is a diagram illustrating an example of a configuration of an information processing system according to an exemplary embodiment.

FIG. 1 is a diagram illustrating an example of a configuration of an information processing system 90 according to the present exemplary embodiment.

As illustrated in FIG. 1, the information processing system 90 according to the present exemplary embodiment includes a server apparatus 10, confirmer terminal apparatuses 40A, 40B, . . . , an image reading apparatus 50, and an administrator terminal apparatus 60. The server apparatus 10 is an example of an information processing apparatus.

The server apparatus 10 is communicably connected with each of the confirmer terminal apparatuses 40A, 40B, . . . , the image reading apparatus 50, and the administrator terminal apparatus 60 via a network N. As an example, a general-purpose computer such as a server computer, a personal computer (PC), or the like is applied to the server apparatus 10. In addition, as the network N, for example, the Internet, a local area network (LAN), a wide area network (WAN), or the like is applied.

The image reading apparatus 50 has a function of optically reading a form or the like of a paper medium to obtain image data and transmitting the obtained image data (hereinafter, referred to as "form image") to the server apparatus 10. As the form referred to here, for example, various forms including a plurality of items such as an address field and a name field are used. In the form, a handwritten text, a printed text, and the like are filled in each of the plurality of items. The form is an example of a document and the item is an example of an area. As specifically described below, the server apparatus 10 performs an optical character recognition (OCR) process, which is an example of an optical character recognition process, on the form image received from the image reading apparatus 50 and obtains a recognition result for an image corresponding to each of the plurality of items. An example of the recognition result includes a text string and the like indicating a sequence of one text or more. Hereinafter, an image obtained by the server apparatus 10 optically reading a handwritten text, a printed text, or the like is also referred to as "image to be recognized". A recognition result according to the present exemplary embodiment is not limited to the recognition result by the OCR process, but the recognition result includes a recognition result of a form of a text or a picture, or an attribute of the text, as described below. In addition, the picture referred to here includes all of elements which are not texts to be recognized in the form image, and includes a line, a seal, a logo, a photo, and the like, as examples.

The confirmer terminal apparatus 40A is a terminal apparatus operated by a confirmer (user) U1 who performs a confirming operation and the confirmer terminal apparatus 40B is a terminal apparatus operated by a confirmer U2 who performs a confirming operation. In a case where it is not necessary to distinguishably describe a plurality of confirmer terminal apparatuses 40A, 40B, . . . , the confirmer terminal apparatuses 40A, 40B, . . . are also collectively referred to as a confirmer terminal apparatus 40. In addition, in a case where it is not necessary to distinguishably describe a plurality of confirmers U1, U2, . . . , the confirmers U1, U2, . . . are also collectively referred to as a confirmer U. For example, a general-purpose computer such as a personal computer (PC), a portable terminal apparatus such as a smartphone, a tablet terminal, or the like is applied to the confirmer terminal apparatus 40. In the confirmer terminal apparatus 40, a confirming operation application program (hereinafter, also referred to as "confirming operation app") for the confirmer U to perform a confirming operation is installed, and a user interface (UI) for the confirming operation is generated and displayed.

The confirming operation described above means an operation of confirming or correcting a recognition result of a text included in a form image, an operation of confirming a picture included in the form image, or the like. Specifically, the operation of confirming the recognition result of the text is an operation of approving the recognition result by the OCR. The operation of correcting the recognition result of the text is an operation of performing an input in a correction input field on a confirming operation screen to be described below. The operation of confirming the picture is, for example, an operation of confirming the presence or absence of a seal.

The administrator terminal apparatus 60 is a terminal apparatus operated by a system administrator SE and the system administrator SE inputs confirmation method information and the like to be described below to the administrator terminal apparatus 60. For example, a general-purpose computer such as a personal computer (PC), a portable terminal apparatus such as a smartphone, a tablet terminal, or the like is applied to the administrator terminal apparatus 60.

Figure 2:
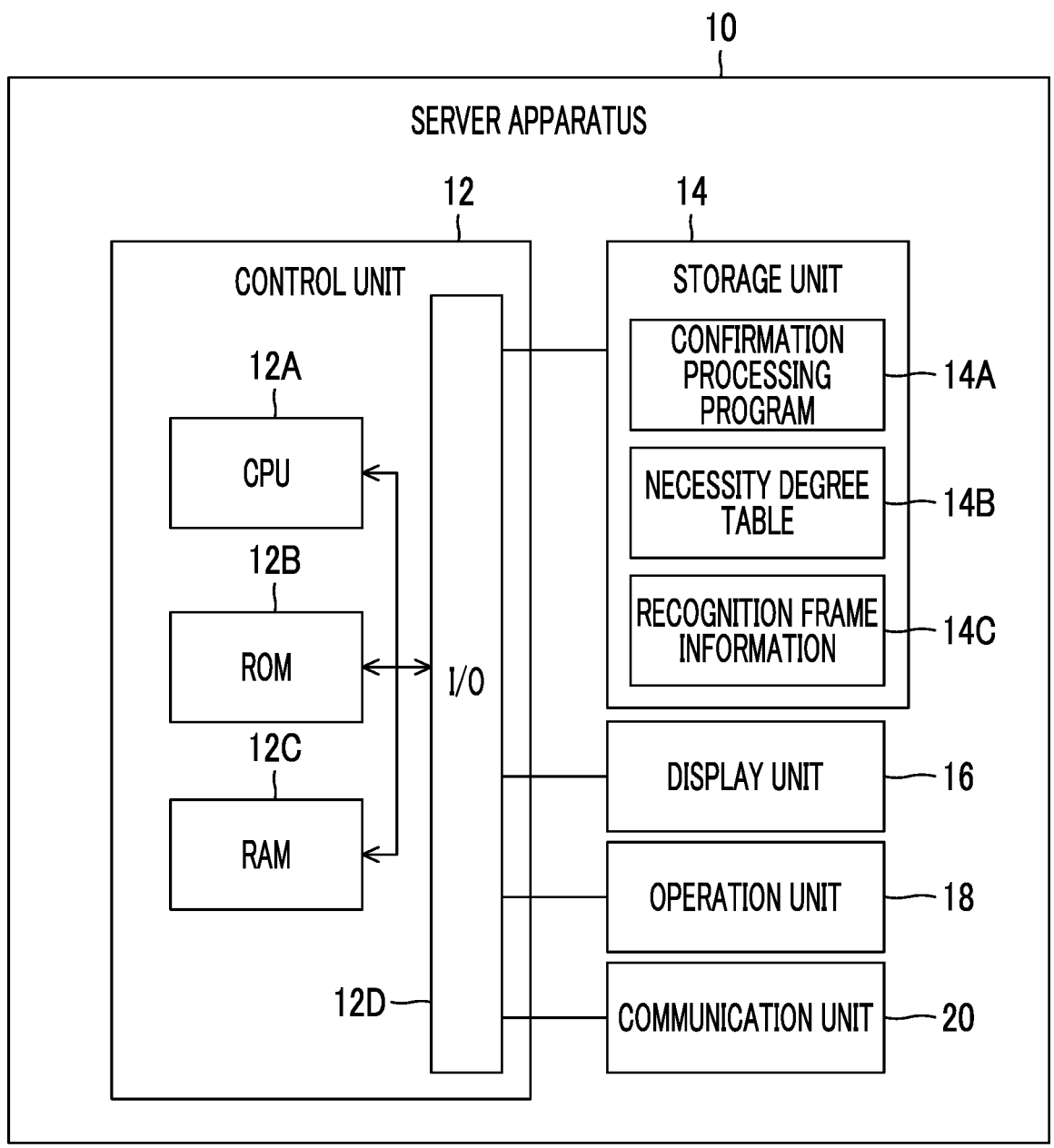
FIG. 2 is a block diagram illustrating an example of an electrical configuration of a server apparatus according to the exemplary embodiment.

FIG. 2 is a block diagram illustrating an example of an electrical configuration of the server apparatus 10 according to the present exemplary embodiment.

As illustrated in FIG. 2, the server apparatus 10 according to the present exemplary embodiment includes a control unit 12, a storage unit 14, a display unit 16, an operation unit 18, and a communication unit 20.

The control unit 12 includes a central processing unit (CPU) 12A, a read only memory (ROM) 12B, a random access memory (RAM) 12C, and an input/output interface (I/O) 12D and these units are connected with one another via a bus.

Each of functional units including the storage unit 14, the display unit 16, the operation unit 18, and the communication unit 20 is connected to the I/O 12D. Each of the functional units enables to mutually communicate with the CPU 12A via the I/O 12D.

The control unit 12 may be configured as a sub-control unit which controls some parts of operations of the server apparatus 10 or may be configured as a part of a main-control unit which controls all of the operations of the server apparatus 10. For example, an integrated circuit (IC) such as a large scale integration (LSI) or an IC chipset is used for a part or all of each of blocks of the control unit 12. An individual circuit may be used for each of the blocks described above, or a circuit of which some or all are integrated may be used for each of the blocks described above. A group of the blocks described above may be provided as one body or some of the blocks may be separately provided. In addition, in each of the blocks described above, a part of the block may be separately provided. For integration of the control unit 12, not only the LSI but also a dedicated circuit or a general-purpose processor may be used.

As the storage unit 14, for example, a hard disk drive (HDD), a solid state drive (SSD), a flash memory, or the like is used. The storage unit 14 stores a confirmation processing program 14A for performing a confirming process according to the present exemplary embodiment. The confirmation processing program 14A may be stored in the ROM 12B. In addition, a necessity degree table 14B and recognition frame information 14C used for the confirming process are stored in the storage unit 14.

The confirmation processing program 14A may be installed in advance in, for example, the server apparatus 10. The confirmation processing program 14A may be realized by appropriately being installed in the server apparatus 10 after being stored in a nonvolatile storage medium or being distributed via the network N. It is assumed that an example of the nonvolatile storage medium is a compact disc read only memory (CD-ROM), a magneto-optical disk, an HDD, a digital versatile disc read only memory (DVD-ROM), a flash memory, a memory card, or the like.

For example, a liquid crystal display (LCD), an organic electro luminescence (EL) display, or the like is used as the display unit 16. The display unit 16 may integrally include a touch panel. The operation unit 18 is provided with a device for an operation input such as a keyboard, a mouse, or the like, for example. The display unit 16 and the operation unit 18 receive various instructions from the user of the server apparatus 10. The display unit 16 displays various types of information such as a result of a process executed according to the instruction received from the user, a notification on the process, and the like.

The communication unit 20 is connected to the network N such as the Internet, a LAN, a WAN, or the like, and enables to communicate with the image reading apparatus 50, the confirmer terminal apparatus 40, and the administrator terminal apparatus 60 via the network N.

Meanwhile, as described above, in a case where the plurality of items having different degrees of necessity of the confirming operation coexist in one form, it is desired that the confirming operation can be executed with an appropriate method for each of the items.

Figure 3:
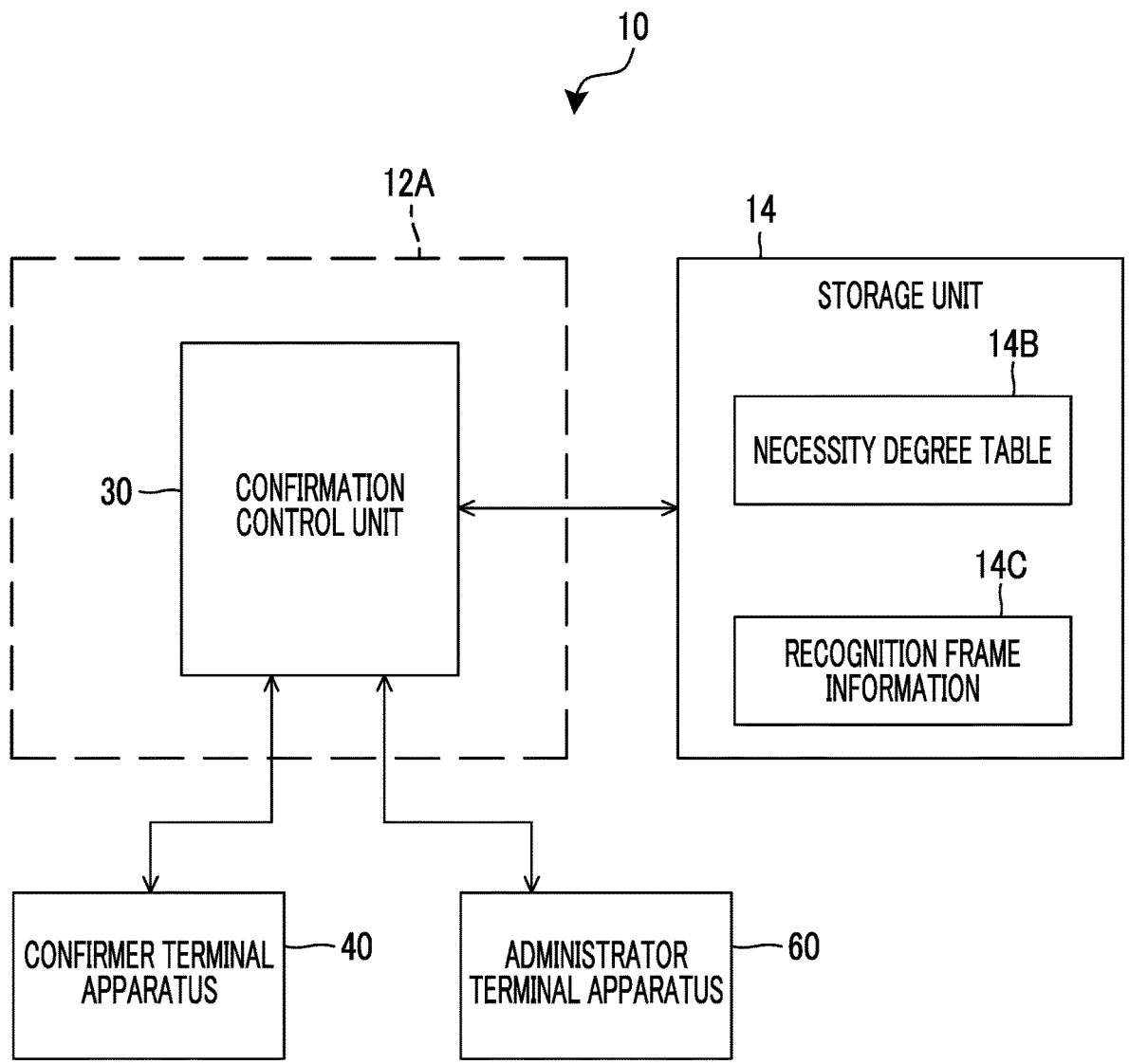
FIG. 3 is a block diagram illustrating an example of a functional configuration of the server apparatus according to the exemplary embodiment.

For this reason, the CPU 12A of the server apparatus 10 according to the present exemplary embodiment functions as a confirmation control unit 30 illustrated in FIG. 3 by writing the confirmation processing program 14A stored in the storage unit 14 in the RAM 12C and executing the confirmation processing program 14A.

FIG. 3 is a block diagram illustrating an example of a functional configuration of the server apparatus 10 according to the present exemplary embodiment.

As illustrated in FIG. 3, the CPU 12A of the server apparatus 10 according to the present exemplary embodiment functions as the confirmation control unit 30. The confirmation control unit 30 is an example of each of an obtaining unit, a setting unit, a determination unit, a recognition unit, and a display control unit. In addition, in the present exemplary embodiment, a case where a form is applied as an example of a document and an item of the form is further applied as an example of an area of the document will be described.

The confirmation control unit 30 according to the present exemplary embodiment obtains a form image which is data obtained by digitizing a form including a plurality of items in one form. The confirmation control unit 30 sets a determination standard for each of the items based on a degree of necessity of a confirming operation for a text or a picture included in the item of the obtain form image. The confirmation control unit 30 performs control to determine a method (hereinafter, also referred to as "confirmation method") of the confirming operation for each of the items based on the set determination standard. As an example, the degree of necessity is determined based on attribute information predetermined for each of the items in one form. For example, the attribute information is included in the recognition frame information 14C and is indicated as the confirmation method information described above, as an example. In this case, the confirmation control unit 30 performs control to determine the confirmation method based on the confirmation method information included in the recognition frame information 14C. The recognition frame information 14C is information in which information on a frame is associated with each of the items in the form image, and as described below, includes a frame type, a frame name, frame coordinates, a text type, a threshold value of a certainty factor, a confirmation method, and the like, as examples.

Specifically, the confirmation control unit 30 obtains the recognition frame information 14C related to the frame for each of the items. The recognition frame information 14C includes the confirmation method information described above as an attribute information of an item. The confirmation method information is information for setting the confirmation method as a determination standard for each of the items. The confirmation method includes, for example, a method of one confirmer performing the confirming operation (hereinafter, also referred to as "single entry method") and a method of a plurality of confirmers performing the confirming operation (hereinafter, also referred to as "double entry method"). The confirmation method may also include a method in which the confirming operation by one or more confirmers is necessary (hereinafter, also referred to as "necessity method") and a method in which the confirming operation by a confirmer is not necessary (hereinafter, also referred to as "needlessness method"). In the necessity method, as an example, in a case where a certainty factor to be described below is equal to or larger than a threshold value, the single entry method may be selected. In a case where the certainty factor is smaller than the threshold value, the double entry method may be selected. In addition, in the needlessness method, the recognition result by the OCR process is adopted as it is, as a final result.

Further, in the confirmation method information described above, the confirmation method may be associated with a position (indicated by coordinates in the present exemplary embodiment) of the frame for each of the items regardless of an attributes (for example, a name field, an address field, or the like) of the frame. In this case, as an example, the double entry method may be associated with a position of a frame of a certain influential item in advance.

In addition, in a case where the confirmation method is not preset to the recognition frame information 14C described above, a recognition result of a text or a picture included in the item may be used. In this case, the degree of necessity described above is determined based on the recognition result of the text or the picture. As described above, the recognition result according to the present exemplary embodiment includes a recognition result by the OCR process, a recognition result of a form of the text or the picture, and a recognition result of an attribute of the text. For example, in a case where an item of "address" is associated with a position of a frame including a text of "神奈川県 (Kanagawa Prefecture)" obtained by being recognized by the OCR process, it is determined that "神奈川県 (Kanagawa Prefecture)" belongs to the item of "address". The position of the frame is obtained from the recognition frame information 14C. In this case, it is determined that the item of "address" is influential, so a degree of necessity is set high for the item of "address". "High" referred to here means that the degree of necessity is higher than a degree of necessity in a case where it is determined that the recognition result of the text or the picture is not influential. In this case, as an example of the determination standard, any one of the single entry method, the double entry method, or the necessity method described above is set.

Figure 4:
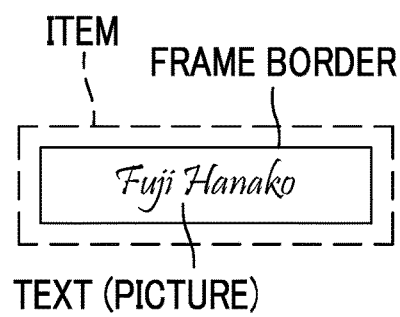
FIG. 4 is a diagram for explaining a relationship of an item, a frame, and a text according to the exemplary embodiment.

FIG. 4 is a diagram for explaining a relationship of an item, a frame, and a text according to the present exemplary embodiment.

As illustrated in FIG. 4, an item included in a form image according to the present exemplary embodiment includes an image of a frame border and an image of a text or a picture. The frame border referred to here is an example of the picture.

In this case, the degree of necessity described above is determined to be high in a case where it is determined that a form of the text or the picture is influential based on the recognition result. "High" referred to here means that the degree of necessity is higher than a degree of necessity in a case where it is determined that the form of the text or the picture is not influential. For example, a color of a text, a thickness of the text, or the like is applied as a form of the text. For example, a color of a picture or the like is applied as a form of the picture. For example, in a case where the color of the text is red or the color of the frame which is an example of the picture is red, the item is determined to be an influential item and the degree of necessity is set high. In this case, as an example of the determination standard, any one of the single entry method, the double entry method, or the necessity method described above is set.

On the other hand, the degree of necessity described above may be determined to be high in a case where it is determined that the attribute of the text is influential based on the recognition result. "High" referred to here means that the degree of necessity is higher than a degree of necessity in a case where it is determined that the attribute of the text is not influential. For example, a name attribute, an address attribute, or the like is applied as an attribute of a text. For example, in a case where the attribute of the recognized text is the name attribute, the item is determined to be an influential item and the degree of necessity is set high. In this case, as an example of the determination standard, any one of the single entry method, the double entry method, or the necessity method described above is set.

Figure 10:
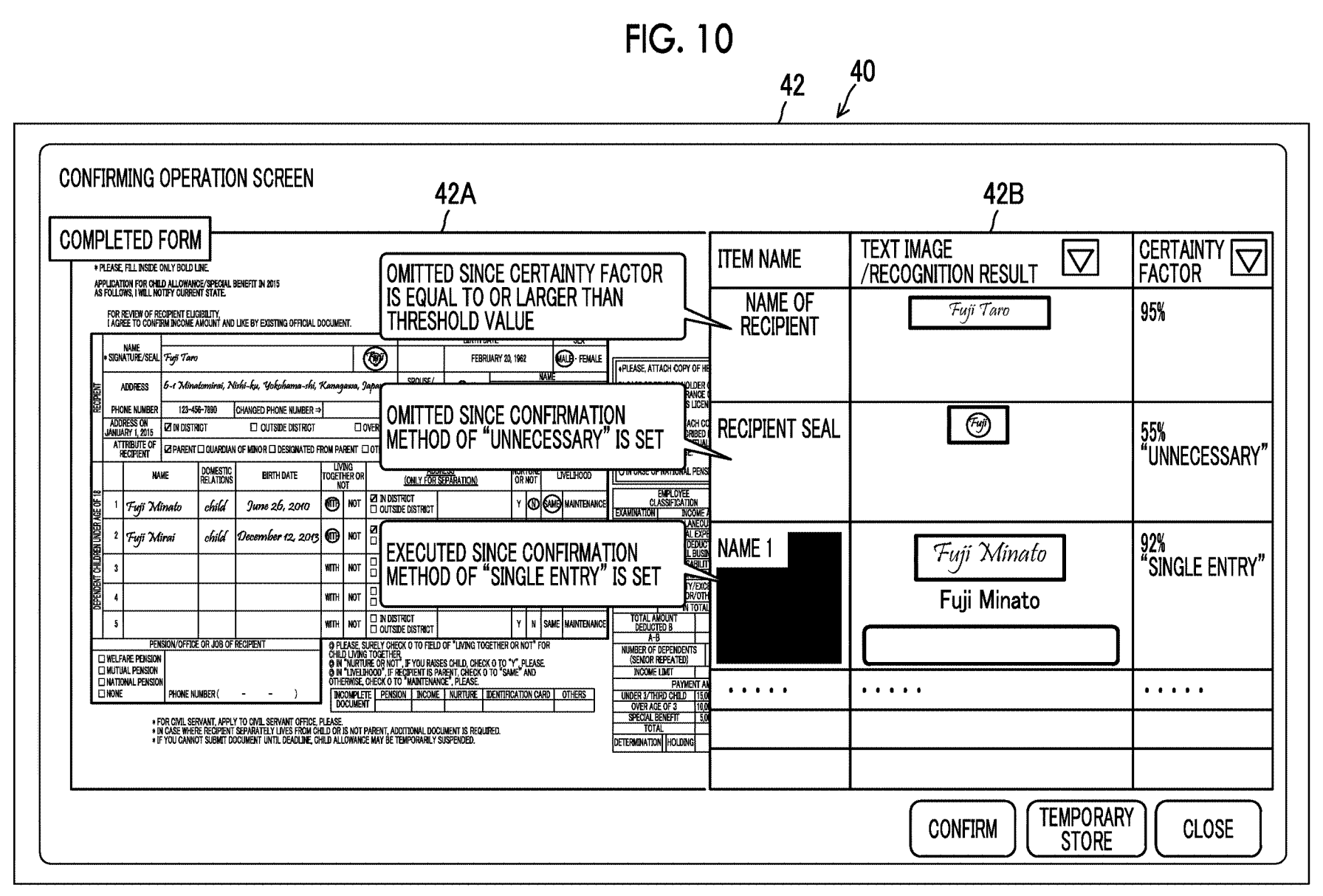
Figures 11, 12:
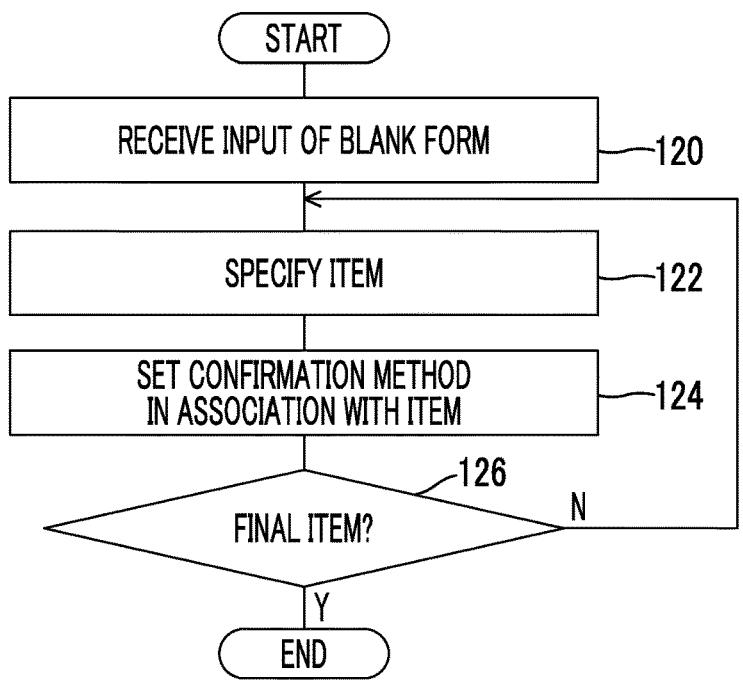
FIG. 11 is a partial view illustrating another example of the confirming operation screen according to the exemplary embodiment.
FIG. 12 is a flowchart illustrating an example of a flow of a recognition setting process by the confirmation processing program according to the exemplary embodiment.

In addition, as illustrated in FIGS. 10 and 11 to be described below, the confirmation control unit 30 may perform control to display a screen for performing a confirming operation, as an example. In this case, as illustrated in FIG. 11 to be described below, the confirmation control unit 30 may perform control to classify the recognition result according to the degree of necessity and display the recognition result.

Further, the determination standard described above may be determined not by the confirmation method itself but by comparison between the certainty factor of the text included in the form image and a threshold value. As an example, in a case where the certainty factor is equal to or larger than the threshold value, it is determined that the confirming operation is unnecessary, and in a case where the certainty factor is smaller than the threshold value, it is determined that the confirming operation is necessary. In this case, the confirmation control unit 30 sets different threshold values for each of the items based on the degree of necessity described above. As an example, in a case where the degree of necessity is higher than a certain value, a threshold value of a certainty factor is set high (severe), and in a case where the degree of necessity is smaller than the certain value, the certainty factor threshold value is set low (loose).

In addition, in a case where it is determined that an attribute of a text for an item is influential, the confirmation control unit 30 may perform control to display that a confirmation method for the item is a method requiring confirmation. Specifically, it is conceivable to preset a flag indicating whether or not the item is influential to each of the items. For example, in a case where the flag indicating that the item is influential is set to an attribute of "address", it is determined that "address" which is the attribute of a text of "神奈川県 (Kanagawa Prefecture)" is influential. "Method requiring confirmation" referred to here includes, for example, the single entry method, the double entry method, and the necessity method described above.

In addition, in a case where it is determined that the certainty factor for the item is smaller than the threshold value, the confirmation control unit 30 may perform control to display that the confirmation method for the item is a method requiring confirmation. A specific form of these displays will be described below.

Next, a specific configuration of the server apparatus 10 according to the present exemplary embodiment will be described with reference to FIG. 5.

FIG. 5 is a block diagram illustrating an example of a specific configuration of the server apparatus 10 according to the present exemplary embodiment.

As illustrated in FIG. 5, the server apparatus 10 according to the present exemplary embodiment includes a recognition setting unit 210, a recognition processing unit 220, a confirming-process execution determining unit 230, a confirmation processing unit 240, a final confirmation processing unit 250, and a recognition result output unit 260. Each of the units specifically illustrates the confirmation control unit 30 illustrated in FIG. 3.

The recognition setting unit 210 according to the present exemplary embodiment performs recognition setting for a form image of a blank form as an input. The recognition setting unit 210 sets confirmation method information by causing the administrator terminal apparatus 60 to display, for example, a form definition screen 62 illustrated in FIG. 6.

FIG. 6 is a front view illustrating an example of the form definition screen 62 according to the present exemplary embodiment.

The form definition screen 62 illustrated in FIG. 6 is displayed on the administrator terminal apparatus 60 and is a screen for receiving confirmation method information input by the system administrator SE.

The form definition screen 62 illustrated in FIG. 6 includes a preview image 62A of a blank form and recognition frame information 62C. The recognition frame information 62C includes, for example, a frame type, a frame name, frame coordinates, a text type, a threshold value of a certainty factor, and a confirmation method and is stored in the storage unit 14 as some pieces of the recognition frame information 14C. In the example illustrated in FIG. 6, the recognition frame information 62C related to "names of dependent children under the age of 18" is displayed. In the confirmation method of "names of dependent children under the age of 18", a setting content in a selected state (in the example illustrated in FIG. 6, "single entry" is selected among "single entry", "double entry", "necessary", "unnecessary", and "no setting") is highlighted. In addition, these setting contents are selectably displayed in a drop-down list and the selected setting contents are input as confirmation method information.

In the example illustrated in FIG. 6, "single entry", "double entry", and "necessary" are examples of the method requiring confirmation. "Single entry" indicates the single entry method and "double entry" indicates the double entry method. In addition, "necessary" indicates the necessity method and "unnecessary" indicates the needlessness method.

FIG. 7 is a front view illustrating still another example of the form definition screen 62 according to the present exemplary embodiment.

In the same manner as FIG. 6 described above, the form definition screen 62 illustrated in FIG. 7 is displayed on the administrator terminal apparatus 60 and is a screen for receiving confirmation method information input by the system administrator SE.

The form definition screen 62 illustrated in FIG. 7 includes the preview image 62A of the blank form and recognition frame information 62D. The recognition frame information 62D includes, for example, a frame type, a frame name, frame coordinates, a text type, a threshold value of a certainty factor, and a confirmation method and is stored in the storage unit 14 as some pieces of the recognition frame information 14C. In the example illustrated in FIG. 7, the recognition frame information 62D related to "recipient name" is displayed. In the confirmation method, a setting content in a selected state (in the example illustrated in FIG. 7, "no setting" is selected among "single entry", "double entry", "necessary", "unnecessary", and "no setting") is displayed. In addition, these setting contents are selectably displayed in a drop-down list and the selected setting contents are input as confirmation method information.

"No setting" means a method of selecting any one of "unnecessary", "single entry", or "double entry" based on a result obtained by comparing a certainty factor and a threshold value of the certainty factor. In "no setting", as an example, in a case where the certainty factor is smaller than the threshold value, "single entry" is selected. In a case where the certainty factor is equal to or larger than the threshold value, "unnecessary" is selected. Alternatively, in the case where the certainty factor is smaller than the threshold value, "double entry" may be selected. In the case where the certainty factor is equal to or larger than the threshold value, "unnecessary" may be selected. Further, in the case where the certainty factor is smaller than the threshold value, "double entry" may be selected. In the case where the certainty factor is equal to or larger than the threshold value, "single entry" may be selected.

That is, as some pieces of the recognition frame information 14C, the recognition setting unit 210 performs control so that the administrator terminal apparatus 60 displays the form definition screen 62 which is an example of an input screen for selectively receiving the confirmation method of the confirming operation for an item. As an example, the recognition setting unit 210 stores the confirmation method information of which the input is received via the form definition screen 62 in the storage unit 14 as some pieces of the recognition frame information 14C.

Next, the recognition processing unit 220 according to the present exemplary embodiment receives an image to be recognized as an input of a form image of a completed form and outputs a recognition result of the image to be recognized and a certainty factor of the recognition result. Based on the setting contents by the recognition setting unit 210, the recognition processing unit 220 performs the OCR process on the received image to be recognized and obtains a recognition result such as a text string and the like. As a recognition method for the text string and the like, a recognition result of the text string and the like and a known technique for outputting a certainty factor of the recognition result may be used. As described above, the certainty factor is an indicator indicating certainty of the text string and the like, and as a value of the certainty factor increases, a probability that the image to be recognized and the text string or the like of the image to be recognized coincide with each other increases. As a method of resolving the certainty factor, for example, a known technique described in JP2016-212812A may be used. Among these methods, there is a method using the certainty factor for each of texts, but as a method for converting the certainty factor of each of the texts into a certainty factor of the text string, an appropriate method may be selected from various methods described below.

Set a maximum value of certainty factors for respective texts in a text string as a certainty factor of the text string.

Set a minimum value of certainty factors for respective texts in a text string as a certainty factor of the text string.

Set an average value (a mode value, a median value, or the like) of certainty factors for respective texts in a text string as a certainty factor of the text string.

In addition to the recognition process by the OCR process described above, the recognition processing unit 220 also executes a recognition process for the form of the text or the picture and a recognition process for the attribute of the text.

The confirming-process execution determining unit 230 according to the present exemplary embodiment determines the confirmation method of the recognition result by using confirmation method information included in the recognition frame information 14C, for the recognition result and a certainty factor of the recognition result output from the recognition processing unit 220. That is, in a case where the single entry method is set as a confirmation method for the item corresponding to the recognition result, the confirming-process execution determining unit 230 determines that the confirmation method of the recognition result is the single entry method regardless of a certainty factor of the recognition result. In addition, in a case where the double entry method is set as a confirmation method for the item corresponding to the recognition result, the confirming-process execution determining unit 230 determines that the confirmation method of the recognition result is the double entry method regardless of a certainty factor of the recognition result. Further, in a case where the confirmation method for the item corresponding to the recognition result is not set, the confirming-process execution determining unit 230 determines the confirmation method of the recognition result based on the certainty factor of the recognition result. In this case, in a case where the certainty factor is smaller than a threshold value, the confirming-process execution determining unit 230 determines that the confirmation method for the recognition result is the single entry method or the double entry method. In a case where the certainty factor is equal to or larger than the threshold value, the confirming-process execution determining unit 230 determines that the confirmation method for the recognition result is the needlessness method. The threshold value used for the determination is obtained from the recognition frame information 14C. The confirming-process execution determining unit 230 outputs a result of the determination to the confirmation processing unit 240.

As described above, the case where the confirmation method is determined by using the confirmation method information included in the recognition frame information 14C is described, but here, the confirmation method may be determined based on a degree of necessity of the confirming operation for the item. The degree of necessity referred to here is a value determined for each of the items according to magnitude of a risk occurring by not confirming the recognition result.

Figures 8, 9:
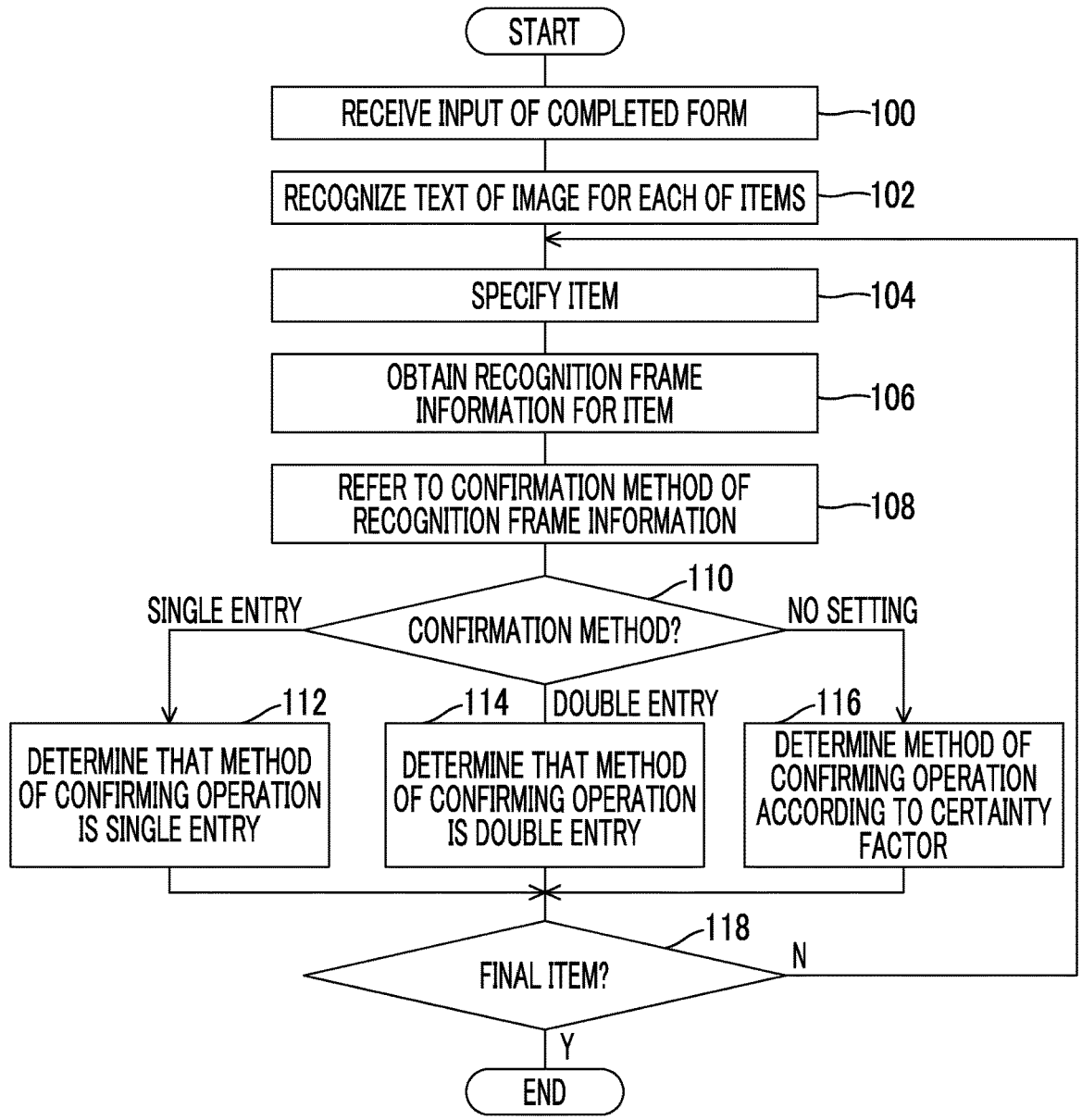
FIG. 8 is a diagram illustrating an example of a necessity degree table according to the exemplary embodiment.
FIG. 9 is a flowchart illustrating an example of a flow of a confirmation determining process by a confirmation processing program according to the exemplary embodiment.

FIG. 8 is a diagram illustrating an example of the necessity degree table 14B according to the present exemplary embodiment.

In the necessity degree table 14B illustrated in FIG. 8, a degree of necessity predetermined by the user such as the system administrator SE or the like is registered in association with each of the plurality of items.

In this case, the confirming-process execution determining unit 230 reads the degree of necessity for the item from the necessity degree table 14B and in a case where the read degree of necessity is equal to or larger than a threshold value, the confirming-process execution determining unit 230 determines that the confirmation method of the recognition result is necessary, that is, a method in which one or more confirmers perform the confirming operation. On the other hand, in a case where the degree of necessity is smaller than the threshold value, the confirming-process execution determining unit 230 determines that the confirmation method of the recognition result is unnecessary, that is, a method in which the confirmer does not perform the confirming operation. As the item having the larger risk occurring by not confirming the recognition result, the degree of necessity is registered as a larger value. For example, in a case of the example illustrated in FIG. 8, "name", "address", and "certification number" are included. Meanwhile, in a case where "certification number" is incorrectly recognized, there is a possibility that a large number of steps for correction is required and a great loss is caused. For this reason, the degree of necessity is increased ("30" in the example illustrated in FIG. 8). On the other hand, since "address" is referred to only in a case of some inquiry, even in a case where "address" is incorrectly recognized, it is conceivable that the occurring risk is small. For this reason, the degree of necessity is decreased ("10" in the example illustrated in FIG. 8).

In addition, as described above, the confirming-process execution determining unit 230 may read the degree of necessity for the item from the necessity degree table 14B, change a threshold value used for determining the certainty factor according to the read degree of necessity, and determine the confirmation method of the recognition result according the changed threshold value.

Based on the determination result received from the confirming-process execution determining unit 230, the confirmation processing unit 240 according to the present exemplary embodiment changes the confirmation method for each of the items, feeds the image to be recognized and the recognition result back to the confirmer U, and causes the confirmer U to perform the confirming operation. Specifically, in a case where it is determined that the confirmation method of the recognition result is the single entry method, the confirmation processing unit 240 causes one confirmer terminal apparatus 40 to display a confirmation screen for performing the confirming operation and on the confirmation screen, the item to be confirmed of the form is emphasized and displayed. The emphasis referred to here includes, as an example, changing a color of an image of the item, giving a background color to the image of the item, further attaching a decoration such as an underline or a borderline to the image of the item, or the like. A specific example of the confirmation screen will be described below. In addition, in a case where it is determined that the confirmation method of the recognition result is the double entry method, the confirmation processing unit 240 causes a plurality of confirmer terminal apparatuses 40 to display confirmation screens for performing the confirming operation and on each of the confirmation screens, the item to be confirmed of the form is emphasized and displayed. That is, the confirmation processing unit 240 displays the confirmation screen for performing the confirming operation for each of the confirmation methods and causes the confirmer U to perform the confirming operation. The confirmation processing unit 240 outputs the image to be recognized, the recognition result, and a confirmation result by the confirmer U to the final confirmation processing unit 250.

Based on the image to be recognized and the recognition result received from the confirmation processing unit 240 and the confirmation result by the confirmer U, the final confirmation processing unit 250 according to the present exemplary embodiment causes a confirmer U different from the confirmer U to perform a final confirming operation. Specifically, the final confirmation processing unit 250 causes the confirmer terminal apparatus 40 used by the other confirmer U to display a confirmation screen for performing the final confirming operation and obtains a final confirmation result from the other confirmer U. Based on the final confirmation result from the other confirmer U, in a case where there is an error in the confirmation result of the confirmer U, the final confirmation processing unit 250 returns the confirmation result to the confirmation processing unit 240 and in a case where there are omissions in the input completed form (for example, page shortage or the like), the final confirmation processing unit 250 returns the confirmation result to the recognition processing unit 220. The final confirmation processing unit 250 outputs the final recognition result to the recognition result output unit 260.

The recognition result output unit 260 according to the present exemplary embodiment outputs the final recognition result received from the final confirmation processing unit 250. An output destination of the final recognition result is not particularly limited, but at least one of the display unit 16, the confirmer terminal apparatus 40, or the administrator terminal apparatus 60 may be set as the output destination.

Next, an action of the server apparatus 10 according to the present exemplary embodiment will be described with reference to FIG. 9.

FIG. 9 is a flowchart illustrating an example of a flow of a confirmation determining process by the confirmation processing program 14A according to the present exemplary embodiment.

First, in a case where the server apparatus 10 receives an instruction of starting the confirmation determining process for a completed form, the confirmation processing program 14A is activated and executes each of the following steps.

In step 100 in FIG. 9, the recognition processing unit 220 receives an input of the completed form.

In step 102, the recognition processing unit 220 recognizes a text by performing the OCR process on an image for each of items in the completed form and obtains a recognition result for each of the items and a certainty factor of the recognition result.

In step 104, the confirming-process execution determining unit 230 specifies an item according to a predetermined order, as an example.

In step 106, the confirming-process execution determining unit 230 obtains the recognition frame information 14C for the item specified in step 104.

In step 108, the confirming-process execution determining unit 230 refers to "confirmation method" of the recognition frame information 14C obtained in step 106.

In step 110, the confirming-process execution determining unit 230 determines setting contents set to "confirmation method" referred to in step 108. In a case where "single entry" is set to "confirmation method" (a case of "single entry"), the process moves to step 112, in a case where "double entry" is set to "confirmation method" (a case of "unnecessary"), the process moves to step 114, and in a case where "no setting" is set to "confirmation method" (a case of "no"), the process moves to step 116.

In step 112, the confirming-process execution determining unit 230 determines that the method of the confirming operation for the recognition result of the image corresponding to the item described above is the single entry method and outputs the determination result to the confirmation processing unit 240.

On the other hand, in step 114, the confirming-process execution determining unit 230 determines that the method of the confirming operation for the recognition result of the image corresponding to the item described above is the double entry method and outputs the determination result to the confirmation processing unit 240.

On the other hand, in step 116, the confirming-process execution determining unit 230 determines the method of the confirming operation for the recognition result of the image corresponding to the item described above by using the certainty factor and outputs the determination result to the confirmation processing unit 240. In this case, in a case where the certainty factor is smaller than a threshold value, the confirming-process execution determining unit 230 determines that the method of the confirming operation for the recognition result is the single entry method or the double entry method. In a case where the certainty factor is equal to or larger than the threshold value, the confirming-process execution determining unit 230 determines that the method of the confirming operation for the recognition result is the needlessness method.

In step 118, the confirming-process execution determining unit 230 determines whether or not the item is a final item. In a case where it is determined that the item is the final item (a case of positive determination), the confirmation determining process by the confirmation processing program 14A is terminated and in a case where it is determined that the item is not the final item (a case of negative determination), the process returns to step 104 and the process is repeated.

Next, a confirming operation by the confirmer U will be described with reference to FIGS. 10 and 11.

FIG. 10 is a front view illustrating an example of a confirming operation screen 42 according to the present exemplary embodiment.

The confirming operation screen 42 is a screen displayed to the confirmer in a case of confirming or correcting a recognition result of a text included in a form which is an example obtained by digitizing a document and for confirming a picture included in the form.

The confirming operation screen 42 illustrated in FIG. 10 is displayed on the confirmer terminal apparatus 40 and is a screen for the confirmer U performing a confirming operation of a recognition result. The confirming operation screen 42 illustrated in FIG. 10 is an example of a screen for performing the confirming operation.

The confirming operation screen 42 illustrated in FIG. 10 includes a preview image 42A of a completed form and a determination result list 42B. The determination result list 42B displays an item for which a confirmation method is determined to be the single entry method, an item for which the confirmation method is determined to be the needlessness method, and an item for which the confirmation method is determined by using a certainty factor, for the completed form represented as the preview image 42A, as a list.

In the example illustrated in FIG. 10, as an example of the item, "recipient name", "recipient seal", and "name 1 of a dependent child under the age of 18" are displayed. In "recipient name", since "no" is set as "confirmation method" and a certainty factor is relatively large, the confirming operation is not illustrated. For this reason, only a corresponding recognition target image ("Fuji Taro" in the example illustrated in FIG. 10) is displayed. In "recipient seal", since "unnecessary" is set to "confirmation method", the confirming operation is not illustrated. For this reason, only a corresponding recognition target image ("Fuji" in the example illustrated in FIG. 10) is displayed. In "name 1 of a dependent child under the age of 18", since "single entry" is set to "confirmation method", the confirming operation is executed as the single entry method. For this reason, a corresponding recognition target image ("Fuji Minato" in the example illustrated in FIG. 10), a recognition result by the OCR process, and a correction input field of the recognition result are displayed. Since "name 1 of a dependent child under the age of 18" is a target of the confirming operation, "name 1 of a dependent child under the age of 18" is emphasized and displayed by changing a color of the item.

Here, as described above, in a case where a form of the text for the item is influential, it may be displayed that the confirmation method for the item is a method requiring confirmation. This will be described with reference to FIG. 10. For example, it is assumed that the form of the text for "address" which is an example of the item is preset as an influential form. An example of "text" referred to here is "神奈川県 (Kanagawa Prefecture)". In this case, it is automatically displayed that the confirmation method for "address" is the method requiring confirmation (as an example, any method of "single entry", "double entry", and "necessary").

In addition, as described above, in a case where it is determined that the certainty factor for the item is smaller than the threshold value, control may be performed so as to display that the confirmation method for the item is a method requiring confirmation.

On the other hand, as illustrated in FIG. 11, the confirming operation screen 42 described above may be displayed for each of the confirmation methods.

FIG. 11 is a partial view illustrating another example of the confirming operation screen 42 according to the present exemplary embodiment.

The confirming operation screen 42 illustrated in FIG. 11 includes a determination result list 42C for each of the confirmation methods. In the example illustrated in FIG. 11, the preview image 42A is not illustrated.

The determination result list 42C illustrated in FIG. 11 is displayed for each of the confirmation methods according to tabs being selected. As described above, the confirmation methods selectable by the tabs are the single entry method, the double entry method, the necessity method, and the needlessness method. In the example illustrated in FIG. 11, in a case where the tab of the single entry method is selected, the item determined to be the single entry method is displayed as a list.

Next, another action of the server apparatus 10 according to the present exemplary embodiment will be described with reference to FIG. 12.

FIG. 12 is a flowchart illustrating an example of a flow of a recognition setting process by the confirmation processing program 14A according to the present exemplary embodiment.

First, in a case where the server apparatus 10 receives an instruction of starting the recognition setting process for a blank form, the confirmation processing program 14A is activated and executes each of the following steps.

In step 120 in FIG. 12, the recognition setting unit 210 receives an input of the blank form.

In step 122, the recognition setting unit 210 specifies an item according to a predetermined order, as an example.

In step 124, the recognition setting unit 210 set a confirmation method in association with the item specified in step 122. In the present exemplary embodiment, as an example, the confirmation method is set from the form definition screen 62 illustrated in FIGS. 6 and 7 described above.

In step 126, the recognition setting unit 210 determines whether or not the item is a final item. In a case where it is determined that the item is the final item (a case of positive determination), the recognition setting process by the confirmation processing program 14A is terminated and in a case where it is determined that the item is not the final item (a case of negative determination), the process returns to step 122 and the process is repeated.

According to the present exemplary embodiment, regardless of the case where the plurality of items having different degrees of necessity coexist in the form, a confirming operation of an appropriate method is executed for each of the items as compared with a case where the confirming operation method is changed by using an identical condition for all of the items.

The server apparatus is described as an example of the information processing apparatus according to the exemplary embodiment. The exemplary embodiment may be provided in a form of a non-transitory computer readable medium storing a program for causing a computer to execute the function of each of the units included in the server apparatus. The exemplary embodiment may be provided in a form of a storage medium readable by a computer which stores the program.

In addition, the configuration of the server apparatus described in the exemplary embodiment described above is merely an example, and may be changed according to a situation within a range not deviating from the gist.

Further, a flow of the process of the program described in the exemplary embodiment is also an example and unnecessary steps may be deleted, new steps may be added, or the processing order may be exchanged within the range not deviating from the gist.

In addition, in the exemplary embodiment described above, the case where the process according to the exemplary embodiment is realized by a software configuration using a computer by executing the program, but the exemplary embodiment is not limited thereto. The exemplary embodiment may be realized by, for example, a hardware configuration or a combination of the hardware configuration and the software configuration.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to
   obtain image data which is data obtained by digitizing a document including a plurality of areas in one document having a plurality of attributes;
   recognize an attribute among the plurality of attributes of a text or a picture included in an area among the plurality of areas of the image data;
   determine a degree of necessity of a confirming operation for the text or the picture included in the area of the image data based on the attribute recognized, wherein the degree of necessity is registered in association with each of the plurality of attributes;
   set a determination standard for each of the areas based on the degree of necessity of the confirming operation for the text or the picture included in the area of the image data; and
   determine a method of the confirming operation for each of the areas based on the determination standard.

2. The information processing apparatus according to claim 1,
   wherein the degree of necessity is determined based on attribute information predetermined for each of the areas in the one document.

3. The information processing apparatus according to claim 1,
   wherein the degree of necessity is determined based on a recognition result.

4. The information processing apparatus according to claim 3,
   wherein the degree of necessity is determined to be high in a case where it is determined that a form of the text or the picture is influential, based on the recognition result.

5. The information processing apparatus according to claim 3,
   wherein the degree of necessity is determined to be high in a case where it is determined that the attribute of the text is influential, based on the recognition result.

6. The information processing apparatus according to claim 3, the processor is further configured to:
   perform control to display a screen for performing the confirming operation, and
   perform control to classify and display the recognition result according to the degree of necessity.

7. The information processing apparatus according to claim 4, the processor is further configured to:
   perform control to display a screen for performing the confirming operation, and
   perform control to classify and display the recognition result according to the degree of necessity.

8. The information processing apparatus according to claim 5, the processor is further configured to:
   perform control to display a screen for performing the confirming operation, and
   perform control to classify and display the recognition result by the recognition unit according to the degree of necessity.

9. The information processing apparatus according to claim 1,
   wherein the determination standard is determined by comparing a certainty factor which is a value indicating certainty of a recognition result of the text included in the image data with a threshold value, and
   the processor is further configured to set the threshold value different for each of the areas based on the degree of necessity.

10. The information processing apparatus according to claim 2,
    wherein the determination standard is determined by comparing a certainty factor which is a value indicating certainty of a recognition result of the text included in the image data with a threshold value, and
    the processor is further configured to set the threshold value different for each of the areas based on the degree of necessity.

11. The information processing apparatus according to claim 3,
    wherein the determination standard is determined by comparing a certainty factor which is a value indicating certainty of a recognition result of the text included in the image data with a threshold value, and the processor is further configured to set the threshold value different for each of the areas based on the degree of necessity.

12. The information processing apparatus according to claim 4,
wherein the determination standard is determined by comparing a certainty factor which is a value indicating certainty of a recognition result of the text included in the image data with a threshold value, and
the processor is further configured to set the threshold value different for each of the areas based on the degree of necessity.

13. The information processing apparatus according to claim 5,
wherein the determination standard is determined by comparing a certainty factor which is a value indicating certainty of a recognition result of the text included in the image data with a threshold value, and
the processor is further configured to set the threshold value different for each of the areas based on the degree of necessity.

14. The information processing apparatus according to claim 6,
wherein the determination standard is determined by comparing a certainty factor which is a value indicating certainty of a recognition result of the text included in the image data with a threshold value, and
the processor is further configured to set the threshold value different for each of the areas based on the degree of necessity.

15. The information processing apparatus according to claim 7,
wherein the determination standard is determined by comparing a certainty factor which is a value indicating certainty of a recognition result of the text included in the image data with a threshold value, and
the processor is further configured to set the threshold value different for each of the areas based on the degree of necessity.

16. The information processing apparatus according to claim 8,
wherein the determination standard is determined by comparing a certainty factor which is a value indicating certainty of a recognition result of the text included in the image data with a threshold value, and
the processor is further configured to set the threshold value different for each of the areas based on the degree of necessity.

17. A non-transitory computer readable medium storing a program causing a computer to function as each unit included in the information processing apparatus according to claim 1.

18. A non-transitory computer readable medium storing a program causing a computer to function as each unit included in the information processing apparatus according to claim 2.

19. A non-transitory computer readable medium storing a program causing a computer to function as each unit included in the information processing apparatus according to claim 3.

20. A non-transitory computer readable medium storing a program causing a computer to function as each unit included in the information processing apparatus according to claim 4.

* * * * *